(12) United States Patent
Camp, Jr. et al.

(10) Patent No.: US 10,015,955 B2
(45) Date of Patent: Jul. 10, 2018

(54) TACKLE COOL BOX

(71) Applicants: William P. Camp, Jr., Vanlue, OH (US); Daniel J. DiMassa, Wooster, OH (US)

(72) Inventors: William P. Camp, Jr., Vanlue, OH (US); Daniel J. DiMassa, Wooster, OH (US)

(*) Notice: Subject to any disclaimer, the term of this patent is extended or adjusted under 35 U.S.C. 154(b) by 649 days.

(21) Appl. No.: 14/660,119

(22) Filed: Mar. 17, 2015

(65) Prior Publication Data
US 2015/0257376 A1 Sep. 17, 2015

Related U.S. Application Data

(60) Provisional application No. 61/954,008, filed on Mar. 17, 2014.

(51) Int. Cl.
*A01K 97/06* (2006.01)
*A01K 97/22* (2006.01)
(Continued)

(52) U.S. Cl.
CPC .............. *A01K 97/06* (2013.01); *A01K 97/04* (2013.01); *A01K 97/10* (2013.01); *A01K 97/22* (2013.01)

(58) Field of Classification Search
CPC ........ A01K 97/05; A01K 97/04; A01K 97/06; A01K 97/22; Y10S 220/9152; Y10S 220/9151; A45C 11/20; F25D 3/08; B25H 3/00; B65D 21/086; B65D 21/0233; B65D 21/02; B65D 25/2835; B65D 25/2867; B65D 25/285; B65D 43/16
(Continued)

(56) References Cited

U.S. PATENT DOCUMENTS

| 417,979 A | * | 12/1889 | Borcherdt | .............. | A01K 97/06 |
| | | | | | 220/522 |
| 1,453,121 A | * | 4/1923 | Benner | ................... | E05B 65/46 |
| | | | | | 292/81 |

(Continued)

FOREIGN PATENT DOCUMENTS

| AT | 509386 B1 * | 1/2012 | ............. A01K 97/22 |
| DE | 3434462 A1 * | 3/1986 | ............. A01K 97/22 |

(Continued)

OTHER PUBLICATIONS

Translation of FR 2569948.*

*Primary Examiner* — Darren W Ark
(74) *Attorney, Agent, or Firm* — Jacob M. Ward; Ward Law Office LLC

(57) ABSTRACT

A tackle cool box has a main body and a cooler. The cooler is slidably attached to a bottom side of the main body. The cooler has a pair of chambers, and is slidable to each of a closed position, a first open position, and a second open position. In the closed position, the chambers of the cooler are both disposed between a first side and a second side of the main body. In the first open position, one chamber is at least partly disposed outwardly from the first side and the other chamber is disposed between the first side and the second side of the main body. In the second open position, one chamber is at least partly disposed outwardly from the second side and the other chamber is disposed between the first side and the second side of the main body.

12 Claims, 6 Drawing Sheets

(51) Int. Cl.
*A01K 97/10* (2006.01)
*A01K 97/04* (2006.01)

(58) Field of Classification Search
USPC .......... 62/440–443, 446, 447, 457.1, 457.2, 62/457.7, 458, 463, 464, 331; 43/55, 43/54.1; 206/315.11, 372, 373; 220/8, 220/23.86, 23.83, 915.2, 915.1, 592.03, 220/810, 763, 762, 752; 224/920
See application file for complete search history.

(56) References Cited

U.S. PATENT DOCUMENTS

| | | | | |
|---|---|---|---|---|
| 1,653,530 A * | 12/1927 | Abrachinsky | ........... | A47B 88/00 312/122 |
| 2,171,772 A * | 9/1939 | Viehmann | ........... | A47B 13/00 108/26 |
| 2,272,819 A * | 2/1942 | Poetsch | ........... | A47B 9/00 312/198 |
| 2,404,851 A * | 7/1946 | Knowles | ........... | F25D 25/025 312/286 |
| 2,565,784 A * | 8/1951 | Sheean | ........... | A47B 88/493 312/286 |
| 2,716,046 A * | 8/1955 | Minturn | ........... | A47B 88/57 312/286 |
| 2,870,932 A * | 1/1959 | Davis | ........... | A01K 97/05 43/56 |
| 3,129,042 A * | 4/1964 | Liener-Kunde | ........... | A47B 88/407 312/246 |
| 3,220,625 A * | 11/1965 | Protheroe | ........... | A45C 11/36 206/424 |
| 3,490,169 A * | 1/1970 | Tweed | ........... | A01K 97/06 206/315.11 |
| 3,891,288 A * | 6/1975 | Marquette | ........... | B62B 3/006 211/151 |
| 3,958,359 A * | 5/1976 | Doughty | ........... | A01K 97/06 43/55 |
| 4,002,385 A * | 1/1977 | Hone | ........... | A47B 53/00 312/286 |
| 4,128,170 A * | 12/1978 | Elliott | ........... | A01K 97/04 190/111 |
| D252,115 S * | 6/1979 | Herring | ........... | D3/295 |
| 4,178,049 A * | 12/1979 | Loo | ........... | A47B 88/57 312/286 |
| 4,353,182 A * | 10/1982 | Junkas | ........... | A01K 97/06 206/315.11 |
| 4,555,862 A * | 12/1985 | Panasewich | ........... | A01K 97/06 43/54.1 |
| 4,638,593 A * | 1/1987 | Garcia | ........... | A01K 97/06 43/54.1 |
| 4,794,723 A * | 1/1989 | Arnold | ........... | A01K 97/04 43/54.1 |
| 5,054,669 A * | 10/1991 | Zimbardi | ........... | A01K 97/06 190/118 |
| 5,176,281 A * | 1/1993 | Fiore | ........... | A45C 7/0045 190/102 |
| 5,205,429 A * | 4/1993 | Woolworth | ........... | B25H 3/027 190/33 |
| 5,226,553 A * | 7/1993 | Fiore | ........... | A45C 7/0045 206/315.11 |
| 5,249,388 A * | 10/1993 | Crabtree | ........... | A01K 97/22 43/55 |
| 5,305,544 A * | 4/1994 | Testa, Jr. | ........... | A01K 97/05 43/54.1 |
| 5,505,328 A * | 4/1996 | Stribiak | ........... | A01K 97/06 206/315.11 |
| 5,560,145 A * | 10/1996 | Anderson | ........... | A01K 97/06 403/373 |
| 5,659,995 A * | 8/1997 | Hoffman | ........... | A01K 97/06 220/504 |
| 5,755,057 A * | 5/1998 | Dancer | ........... | A01K 97/06 206/315.11 |
| 5,823,337 A * | 10/1998 | Yunger | ........... | A01K 97/06 206/315.11 |
| 5,957,558 A * | 9/1999 | Quade | ........... | A47B 88/48 312/246 |
| 5,992,086 A * | 11/1999 | Cheng | ........... | A01K 97/06 43/54.1 |
| 6,185,860 B1 * | 2/2001 | Thibodeaux | ........... | A01K 97/06 206/315.11 |
| 6,237,765 B1 * | 5/2001 | Hagen | ........... | A01K 97/05 206/315.11 |
| 6,241,090 B1 * | 6/2001 | Kaplinsky | ........... | A01K 97/06 206/315.11 |
| 6,435,390 B1 * | 8/2002 | Abramowicz | ........... | A01K 97/06 224/629 |
| 6,446,382 B1 * | 9/2002 | Cloutier | ........... | A01K 97/06 43/54.1 |
| 6,527,113 B2 * | 3/2003 | Blake | ........... | A01K 97/06 206/315.11 |
| 6,877,269 B2 * | 4/2005 | Schultz | ........... | A01K 63/003 43/55 |
| 7,036,267 B2 * | 5/2006 | Klein | ........... | A01K 97/01 43/54.1 |
| 7,140,507 B2 * | 11/2006 | Maldonado | ........... | A45C 11/20 220/23.83 |
| 7,762,636 B2 * | 7/2010 | Veeser | ........... | A47B 88/407 219/385 |
| 7,823,991 B2 * | 11/2010 | Purdy | ........... | A47B 67/04 206/373 |
| 8,052,020 B1 * | 11/2011 | Wurtz | ........... | A01K 97/06 224/662 |
| 8,256,156 B1 * | 9/2012 | Burgoyne, Jr. | ........... | A01K 97/06 206/315.11 |
| 8,327,576 B2 * | 12/2012 | Sellers | ........... | A01K 97/04 220/560 |
| 8,474,274 B2 * | 7/2013 | Schalla | ........... | A47B 31/02 62/406 |
| 8,640,377 B2 * | 2/2014 | Baltes | ........... | A01K 97/10 114/364 |
| 8,733,864 B2 * | 5/2014 | Chen | ........... | A47B 88/493 312/333 |
| 9,446,847 B2 * | 9/2016 | Richardson | ........... | B64D 11/04 |
| 2007/0119093 A1 * | 5/2007 | Jaskulski | ........... | A01K 97/06 43/54.1 |
| 2011/0226785 A1 * | 9/2011 | Sakell | ........... | A01K 97/20 220/592.2 |
| 2014/0034530 A1 * | 2/2014 | Carino | ........... | B25H 3/02 206/315.11 |
| 2015/0040606 A1 * | 2/2015 | Hernanz Arbeloa | ... | B62B 3/006 62/457.1 |
| 2017/0245486 A1 * | 8/2017 | Larson | ........... | A01K 97/10 |

FOREIGN PATENT DOCUMENTS

| | | | | |
|---|---|---|---|---|
| EP | 0799115 B1 * | 3/1999 | ........... | A01K 97/22 |
| FR | 2569948 A1 * | 3/1986 | ........... | A01K 97/22 |
| GB | 2278032 A * | 11/1994 | ........... | A01K 97/22 |
| GB | 2372202 A * | 8/2002 | ........... | A01K 97/22 |
| GB | 2372202 B * | 11/2004 | ........... | A01K 97/22 |
| JP | 09047202 A * | 2/1997 | | |
| JP | 11075652 A * | 3/1999 | | |
| JP | 11155451 A * | 6/1999 | | |
| JP | 5279494 B2 * | 9/2013 | ........... | A47B 67/04 |
| KR | 200468499 Y1 * | 8/2013 | | |
| WO | WO-9619326 A1 * | 6/1996 | ........... | A01K 97/22 |

* cited by examiner

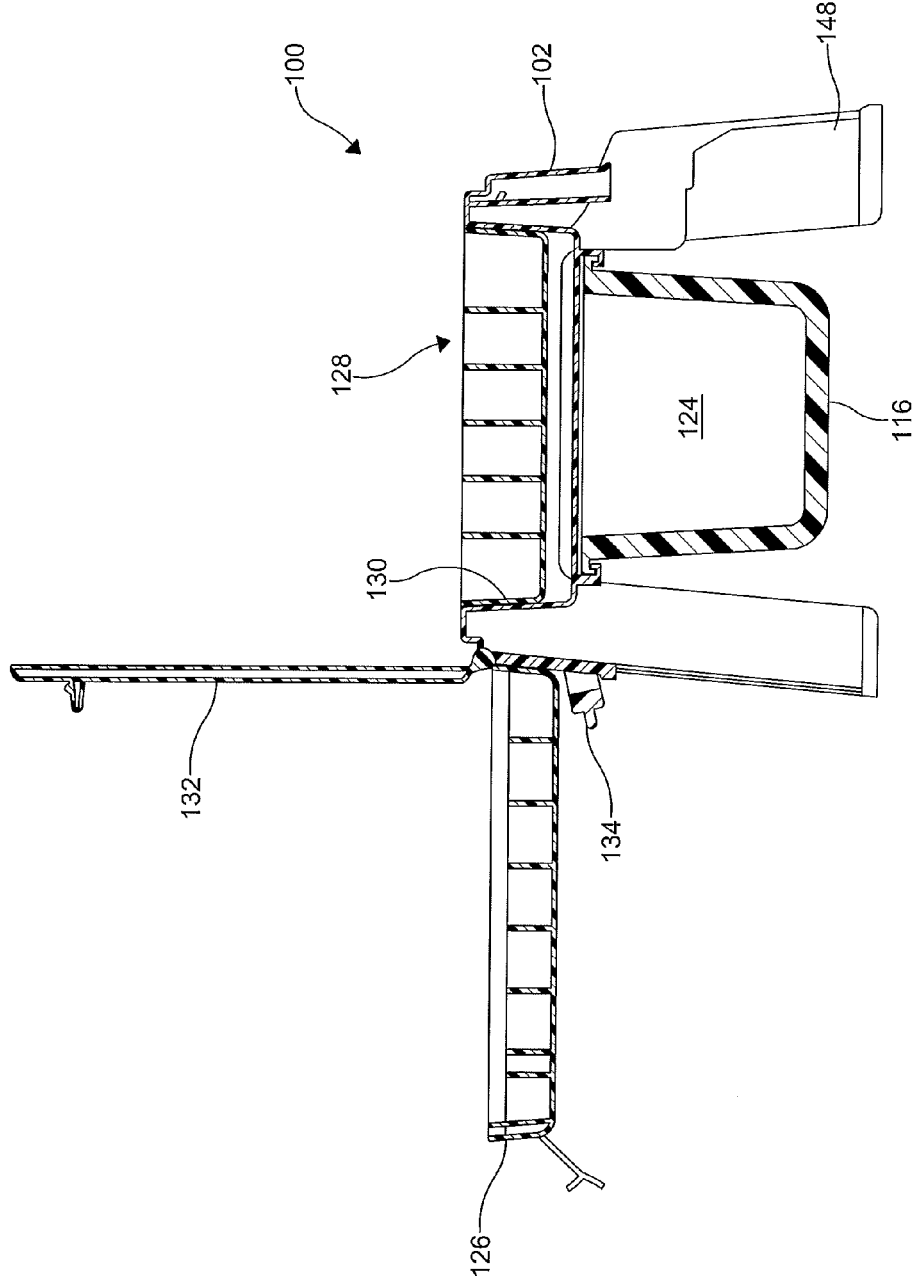

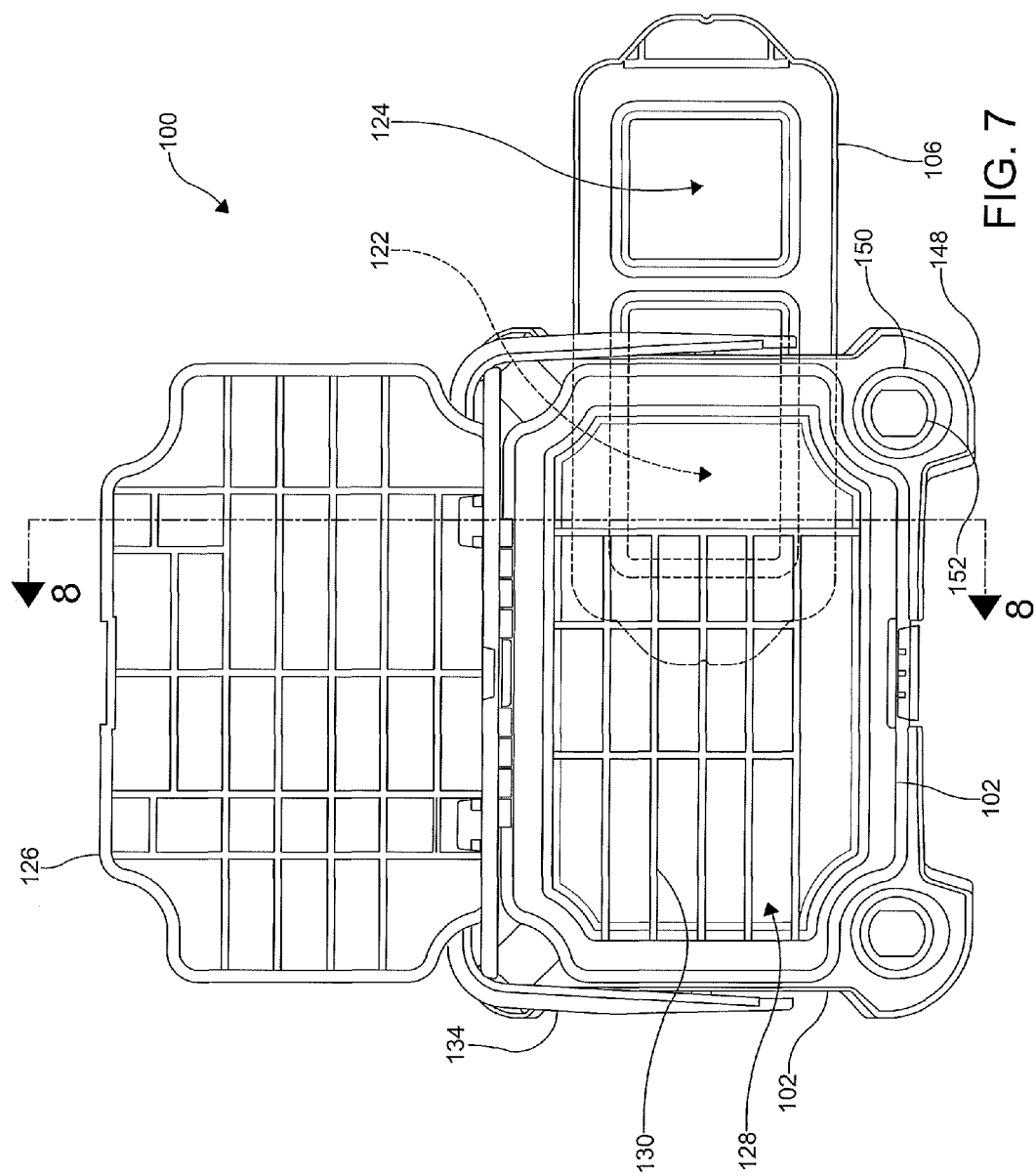

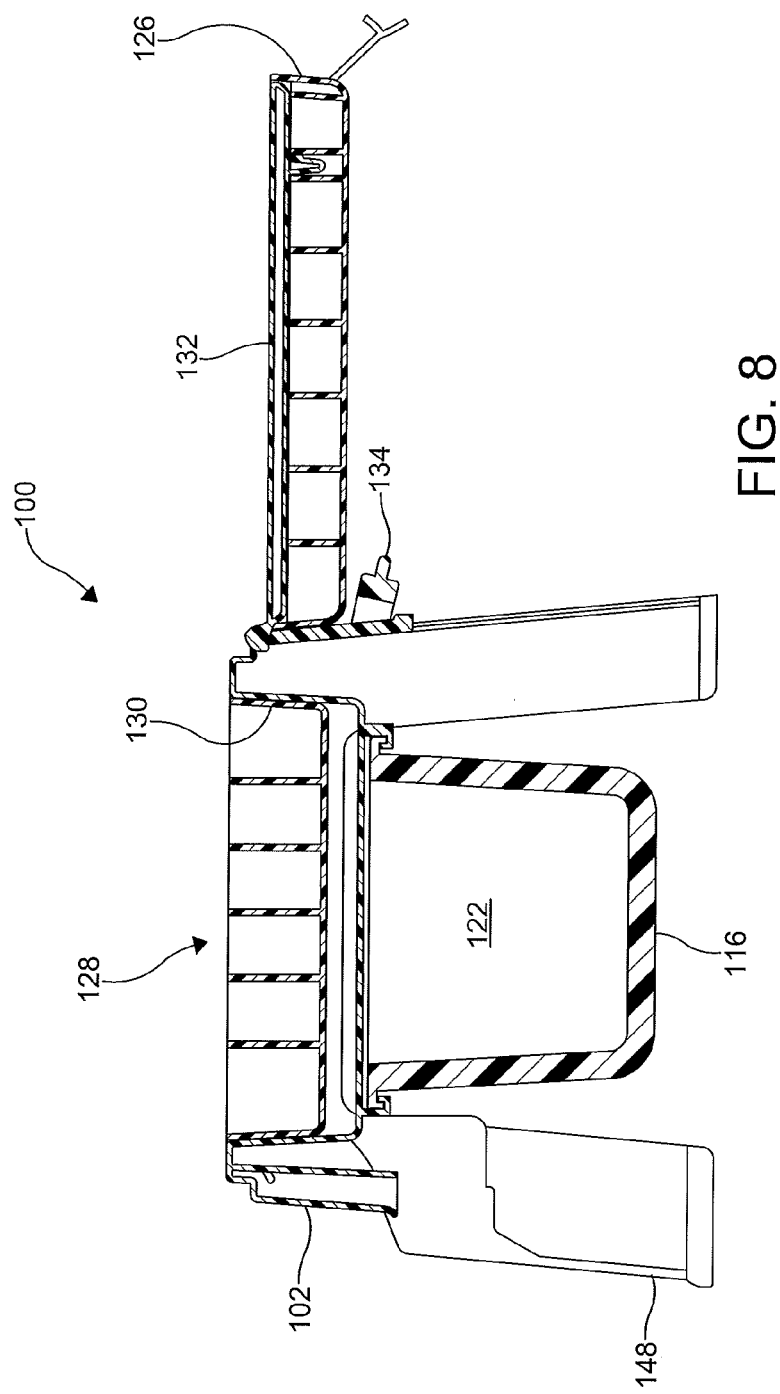

TACKLE COOL BOX

CROSS-REFERENCE TO RELATED APPLICATIONS

This application claims the benefit of U.S. Provisional Application No. 61/954,008, filed on Mar. 17, 2014. The entire disclosure of the above application is hereby incorporated herein by reference.

FIELD

The present disclosure relates to tackle boxes for fishing and, more particularly, to a combination tackle box and cooler.

BACKGROUND

Fishing is one of the most prolific pastimes in the United States today. First a necessity for food and survival, it evolved into the ancient lazy sport of watching a bobber or float and hoping that it is pulled down by "the big one". Now the sport is enhanced by modern techniques and technology such as the use of electronic fish finders, chemical attractants, high-powered bass boats, the latest sure-fire lures and bait, high tech rods and reels containing carbon fiber and graphite, and sophisticated lines bearing well-known trade names. Fishing equipment is now very big business.

A variety of fishing shows on television promote the latest equipment, techniques, and taxidermy. These shows are often hosted by seasoned professional tournament fishermen, willing to share their secrets of success. A number of fishing magazines also support the industry.

Tackle and equipment are sold on commercials, infomercials, and through huge catalog houses. These catalog houses also have a chain of retail outlets, which compete in product offerings with every major sporting goods store, and the industry retail giants.

Fishing is advertised as being very relaxing, unless one is frantically involved in a professional tournament and competing for the large prize purses offered. Fishing as a sport is still a great way for a parent to spend time with a child.

Possibly inspired by the blitz of advertising, some fishermen and women carry tons of equipment with them including rods, tackle box, coolers, chairs and bait box. It becomes difficult to carry the vast array, especially to discrete "secret spots. And, when the fishing is slow, the fisherman often will try to find a "Y" shaped stick to prop up his rod, and try to find a dry and comfortable spot to sit back and relax. Of course, this is difficult on rocky or wet ground, or on the hard surface of a dock or pier. In spite of all this, there is a common expression that "a bad day of fishing beats a good day of work". It takes a lot of room to transport all this equipment and on an off day, it is also difficult to store it all.

Fishing tackle boxes and the lures stored inside come in many shapes and sizes. So do chairs, coolers, and also bait carrying containers. Bait such as minnows, worms, and leaches must be refrigerated to stay alive and active, which is required to attract the finicky fish. These require insulated carriers.

Tired of standing, and lacking an chair, many a fisherman has sat on their tackle box to fish. Many, like these inventors, have broken expensive boxes doing just that. Not only are current products not built to sit on, but they tend to be very difficult to do so anyway. Most are short in height and sitting on them is uncomfortable. Your legs are either stretched straight out, or bent with your knees in your chest. Most also employ a handle right in the center of the top side, right where a person would place their backside.

Others have addressed these problems with inferior solutions. For example, many tackle boxes have add-on rod holders. Some place the rod straight up, where it is difficult to watch the sensitive rod tip for the slightest strike from the fish. Most boxes also have narrow bases, so that if a big one did strike, the box would tumble over. Some have hardware bolted on to place the rod out an angle. This is better for watching the rod tip, but unwieldy and can catch clothing and skin.

A number of known designs can be used for sitting, except for the ones with hardware mounted on top side. One known combination tackle box, bait holder, cooler and seat means is described in U.S. Pat. No. 4,128,170 to Charles Elliott. However, these known designs have not had cut out areas for the legs to fit in between. There are also bait buckets with a seat on top side, again they are not wide at the base nor do they have cut out areas for the legs. Most do not employ a wide seat area.

Known coolers with drawers underneath are wide at the top side and base, but also do not have recesses for the legs. One also cannot access the bait or coolers in any of these known designs without standing up to open them, and bending over to reach inside. This means you can't watch the rod tip at the same time, and could miss the opportunity to catch the fish. This cooler also presents a real problem with cleaning. To tilt it and clean the cooler in a sink, the lures and tackle in the drawers can get all jumbled and tangles.

There is a continuing need for a tackle cool box product having a tackle box, cooler for bait, separate cooler for beverages or food, a chair, a rod holder and a can holder combined into one smartly integrated package. Desirably, the product has a sturdy construction with four legs for seating, integral tackle compartments inside a lid, removable tackle compartment in a base, two compartment coolers removable for cleaning and accessible while seated for bait and/or food and beverages, a locking handle to keep the cooler from sliding out during transport, integral can holders and rod holders in the legs that are accessible while seated, and a watertight lid for wet weather fishing.

SUMMARY

In concordance with the instant disclosure, a tackle cool box product having a tackle box, cooler for bait, separate cooler for beverages or food, a chair, a rod holder, and a can holder that are combined into one smartly integrated package having a sturdy construction with four legs for seating, integral tackle compartments inside a lid, removable tackle compartment in a base, two compartment coolers removable for cleaning and accessible while seated for bait and/or food and beverages, a locking handle to keep the cooler from sliding out during transport, integral can holders and rod holders in the legs that are accessible while seated, and a watertight lid for wet weather fishing, has been surprisingly discovered.

In one embodiment, a tackle cool box has a main body and a cooler. The main body has a top side, a bottom side, a first side with a first opening, and a second side with a second opening. The cooler is slidably attached to the bottom side of the main body. The cooler having a first chamber and a second chamber. The cooler is slidable to each of a closed position, a first open position, and a second open position. In the closed, position, the first chamber and the second chamber of the cooler are both disposed between the first side and the second side of the main body. In the first open position, the first chamber is at least partly disposed at a location laterally outwardly from the first opening of the main body, and the second chamber is disposed between the first side and the second side of the main body. In the second open position, the second chamber is at least partly disposed at a location laterally outwardly from the second opening of the main body, and the first chamber is disposed between the first side and the second side of the main body.

In another embodiment, the tackle cool box includes a lid that is hingedly attached to the main body. The lid is rotatable from an open position to a closed position. The open position permits access to a recess formed in the top side of the main body. The closed position seals the recess formed in the top side of the main body. An outer surface of the lid is free of protrusions and permit one to comfortably sit on the outer surface of the lid. An inner surface of the lid has a plurality of compartments formed therein. A cover is also removably attached to the inner surface of the lid. The cover is configured to selectively close the compartments. The cover may also be transparent, and is disposed between the recess and the lid where the lid is in the closed position.

In a further embodiment, the tackle cool box has a handle that is rotatably connected to the first side and the second side of the main body. The handle is rotatable between a substantially upright position and a stored position. The handle in the substantially upright position is spaced apart from the top side of the main body. The handle in the stored position is adjacent a rear of the main body. A first end of the handle has a first bottom side extension, and a second end of the handle has a second bottom side extension. The first bottom side extension and the second bottom side extension militate against a movement of the cooler from the closed position where the handle is in a substantially upright position.

The tackle cool box product of the present disclosure is designed to be a totally integrated fishing solution. In exemplary embodiments, the product features a tackle box on legs to achieve a more comfortable sitting position while fishing. The legs are spaced so that the fisherman's legs fit comfortably between them. The top side surface is free of protrusions or a handle that would otherwise cause discomfort.

Also, the product has a segregated cooler underneath. One insulated side can be filled with beverages and ice, or hot meals with a heat pack. The other insulated side can contain minnows in water, worms kept cool by ice, cold drinks, or hot sandwiches. In common coolers, it often happens that bait is stored with the beverages. Dirt from the worm container can make a real mess and render the ice unusable for drinking purposes. This cooler is divided to keep each item completely separate. Food can also be kept from the water made by melting ice by keeping the food in the other side.

The tackle cool box is also unique in that the cooler can slide out to either side. The fisherman can remain comfortably seated, never move his legs, and pull the cooler out to one side to access a drink. Still seated, the cooler can be pushed to the other side for a sandwich or bait. When the cooler is moved to the center, the handle can be raised to lock it in place. The cooler also can be completely removed for easy washing in a sink.

Dual-purpose can holders and rod holders are built integrally into each of the front legs. These do not protrude so they are never in the way, even when sitting. They are designed so that a can will fit into either one. The bottom side area supporting the underside of the can also has an oval hole for the rod butt, so a rod can also be put into either one. This oval hole allows the rod to be angled out to more easily watch the rod tip. Since the legs are angled outward from the main body, the legs also present a wide base to prevent tipping.

The tackle cool box opens to allow access to the compartments within. Storage is achieved by use of a lift out drawer, and also in the lid compartments. These lid compartments have a see-through snap over cover to keep all in place when the lid is rotated open, and in the closed position. The lift out drawer is also removable for cleaning and stocking with lures, away from the tackle cool box. Under the lift out drawer is insulation to further keep the cooler compartments warm or cold as desired.

In addition, the handle is designed for ease of carrying, and also stores behind the cooler. The handle is rotated completely out of the way when the fisherman is seated, and makes no contact with the fisherman. It also does not interfere with the cooler sliding out to either side, nor does it interfere with the complete opening of the tackle box to access the lures within. It is rotated forward for packaging the cooler in the shipping carton, and does not protrude past the lower footprint, minimizing carton size.

A further benefit of the handle is that when it is in the vertical position to carry the tackle cool box, the bottom side extensions of the handle engage the centered cooler at the handles and prevent the cooler from sliding out in either direction. This makes it safe and secure to carry the box without fear of the cooler exiting and dumping the contents. The engagement is accomplished by the geometry of the handle. It is shaped to be an arc and requires the handle to flex it in to engage and disengage. The built in spring force of the handle keeps the handle in place, but can be flexed when the handle is physically rotated, allowing the handle to disengage and rotate to clear the cooler.

BRIEF DESCRIPTION OF THE DRAWINGS

The drawings described herein are for illustrative purposes only of selected embodiments and not all possible implementations, and are not intended to limit the scope of the present disclosure.

FIG. 6 is left side cross-sectional elevational view of the tackle cool box taken along section line 6-6 in FIG. 5;

FIG. 7 is a top side plan view of the tackle cool box shown in FIGS. 1-4, further shown with an open lid, a handle rotated downwardly and to a rear of the tackle cool box, and a cooler slid out to the right to provide access to a second chamber of the cooler, a sealed portion of the cooler shown in dashed lines, and the tackle cool box also shown with a closed tackle box cover to secure contents of tackle box compartments in an underside of the open lid; and FIG. 8 is right side cross-sectional elevational view of the tackle cool box taken along section line 8-8 in FIG. 7.

DETAILED DESCRIPTION

Figure 1:
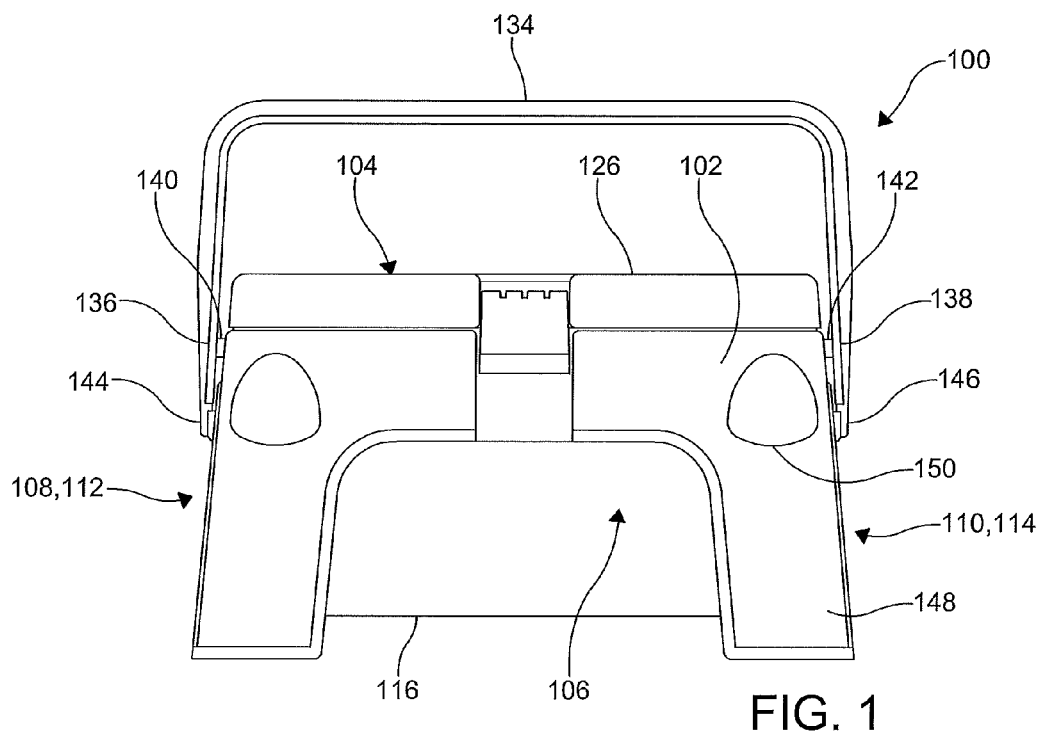
FIG. 1 is a front elevational view of a tackle cool box according to one embodiment of the present disclosure.
Figure 2:
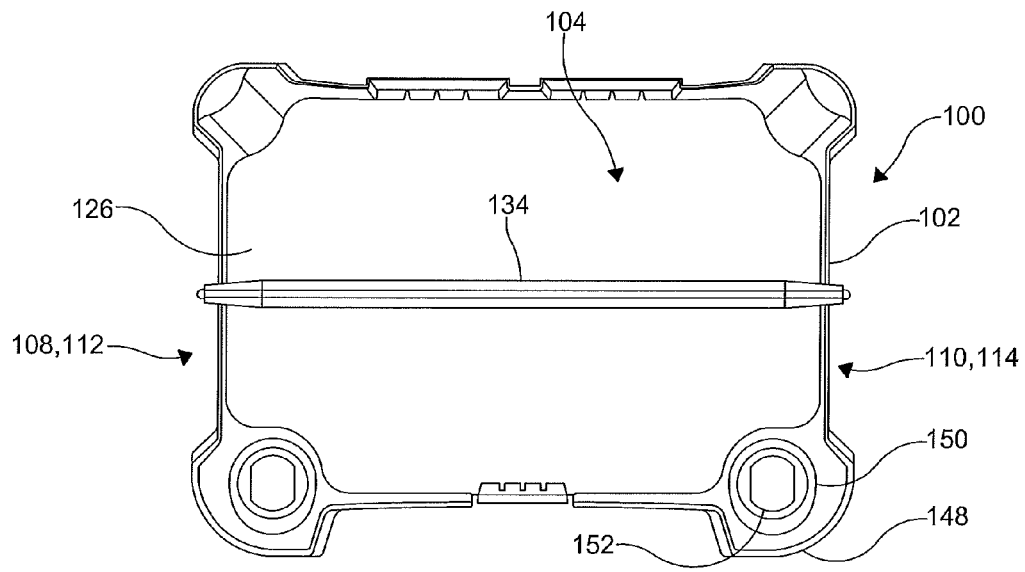
FIG. 2 is a top side plan view of the tackle cool box shown in FIG. 1.
Figure 3:
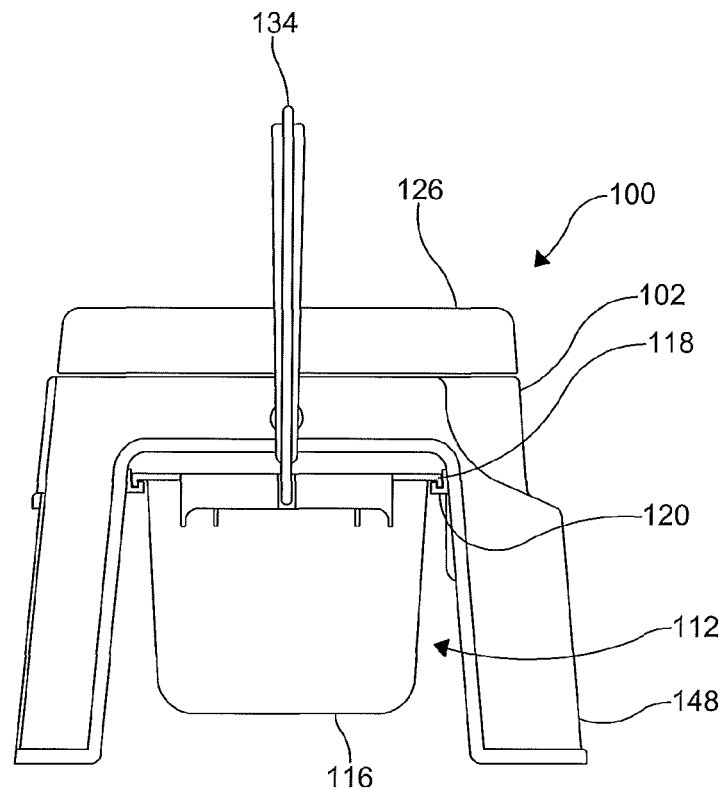
FIG. 3 is a left side elevational view of the tackle cool box shown in FIGS. 1-2.
Figure 4:
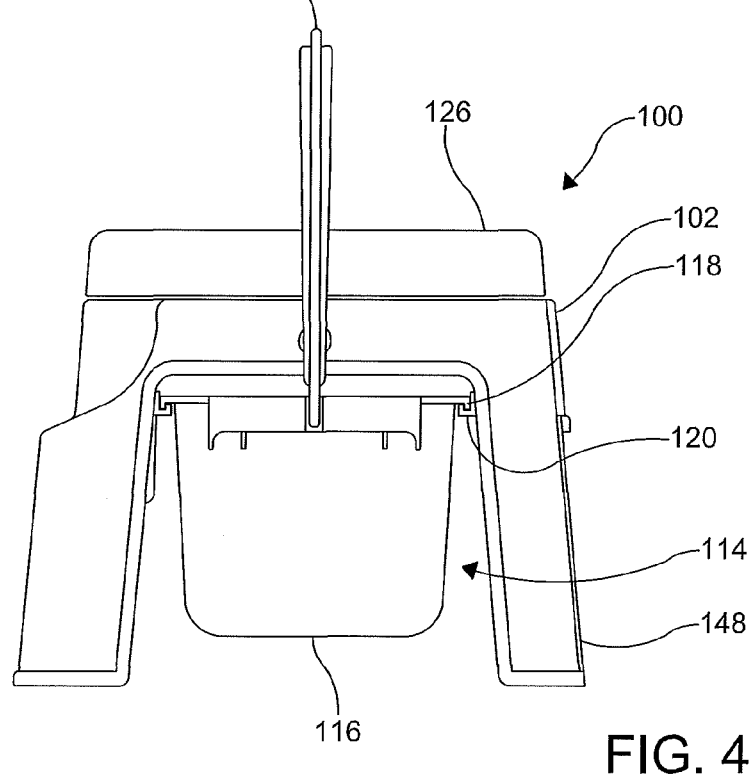
FIG. 4 is a right side elevational view of the tackle cool box shown in FIGS. 1-3.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-8 illustrate a tackle cool box 100 according to the present disclosure. As used herein, the term "tackle cool box" is defined as being combination tackle box for storing fishing tackle and cooler for storing items under cooled or heated conditions.

The tackle cool box 100 has a tackle box main body 102. The main body 102 is desirably formed from a weather-resistant material. For example, the main body 102 may be formed from a thermoplastic material by injection molding or other suitable process for molding a thermoplastic material. Other suitable materials for the main body 102 may also be selected by a skilled artisan within the scope of the present disclosure.

The main body 102 has a top side 104, a bottom side 106, a first side 108, and a second side 110. The first side 108 has a first opening 112 formed therein. The second side 110 has a second opening 114 formed therein. The first opening 112 and the second opening 114 are connected and together define a passage through the main body 102.

The tackle cool box 100 also has a cooler 116. The cooler 116 is insulated or otherwise formed from an thermally-insulative material. For example, the cooler 116 may have a closed cell polymer foam configured to militate against a transfer of heat to or from the contents of the cooler 116 when sealed. One of ordinary skill in the art may select suitable materials and constructions for the cooler 116, as desired.

The cooler 116 is slidably attached to the bottom side 106 of the main body 102. For example, the cooler 116 may have lips 118 disposed on opposing sides of the cooler 116 that are received by channels 120 disposed on the bottom side 106 of the main body 102. The channels 120 may extend between the first side 110 and the second side 112 of the main body 102. The channels 120 support the cooler 116 and permit it to be slid to and fro through the passage formed through the main body 102. The cooler 116 may also be slid completely out of the main body 102 for cleaning, for example. The lips 118 may be integrally formed with the cooler 116, or attached to the cooler 116 with a fastener, as desired. The channels 120 may be integrally formed with the main body 102, or attached to the main body 102 with a fastener, as desired.

As shown in FIGS. 5-8, the cooler 116 also has two chambers, including a first chamber 122 and a second chamber 124. The first chamber 122 and the second chamber 124 are separated by a wall or partition of the cooler 116. For example, the first chamber 122 may be configured to receive food or drinks, and the second chamber 124 may be configured to receive bait for fishing. Additional chambers or partitions for the chambers are also contemplated and may be used in the cooler 116 by one skilled in the art.

The cooler 116 of the present disclosure is slidable relative to the main body 102 to each of a closed position, a first open position, and a second open position. In the closed position, shown in FIGS. 1-4, the first chamber 122 and the second chamber 124 of the cooler 116 are both disposed between the first side 108 and the second side 110 of the main body 102. The first chamber 122 and the second chamber 124 of the cooler 116 are both sealed by cooperation with the bottom side 106 of the main body 102, to facilitate a maintaining of a temperature of the contents of the first chamber 122 and the second chamber 124 while the cooler 116 is in the closed position. In one example, the bottom side 106 of the main body 102 forms a substantially fluid tight seal with the cooler 116 where in the closed position.

Figure 5:
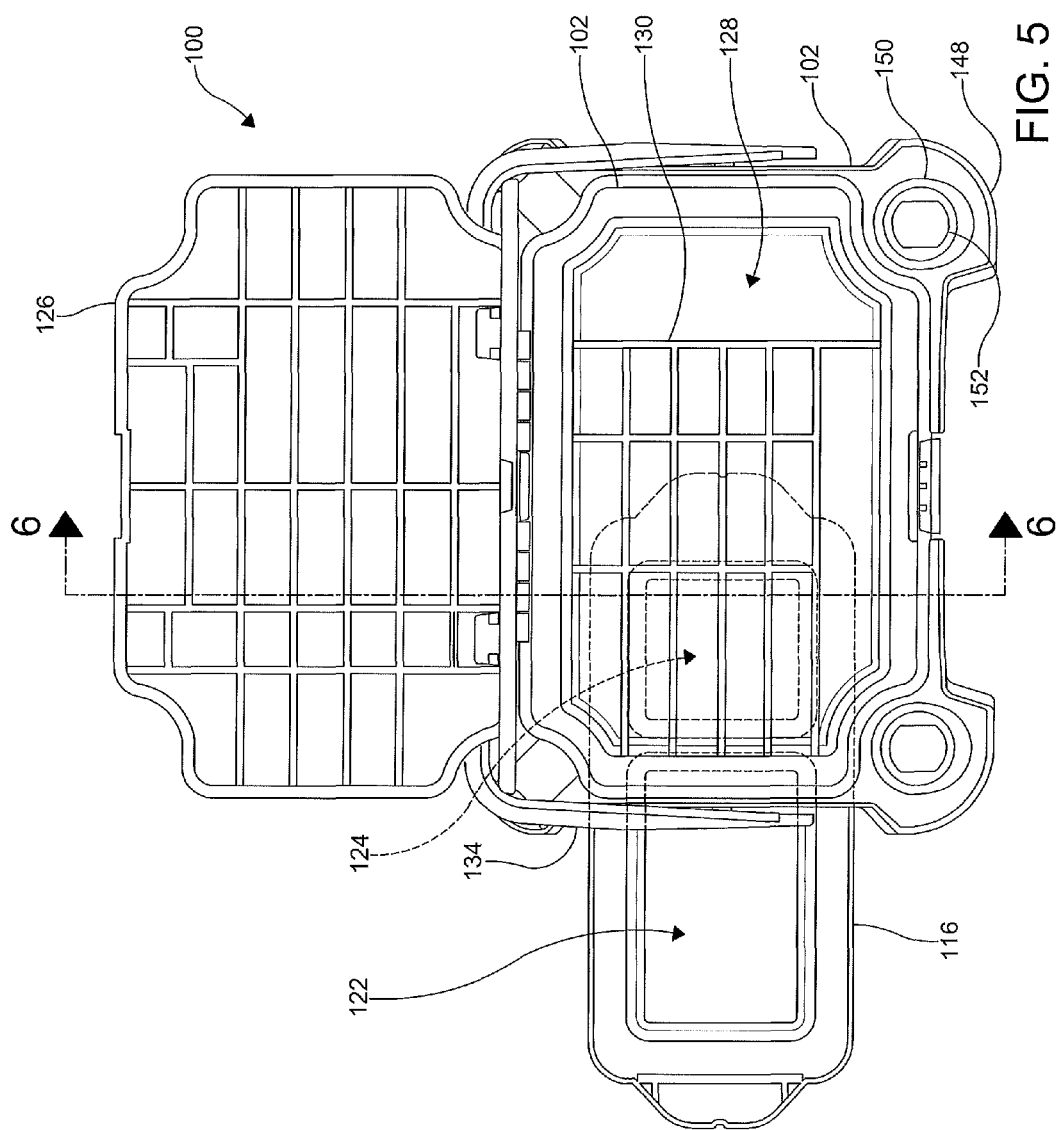
FIG. 5 is a top side plan view of the tackle cool box shown in FIGS. 1-4, further shown with an open lid, a handle rotated downwardly and to a rear of the tackle cool box, and a cooler slid out to the left to provide access to a first chamber of the cooler, a sealed portion of the cooler shown in dashed lines, and the tackle cool box also shown with an open tackle box cover to provide access to tackle box compartments in an underside of the open lid.

In the first open position, shown in FIGS. 5-6, the cooler 116 is slid through the first opening 112 of the main body 102 so that the first chamber 122 is at least partly disposed at a location laterally outwardly from the first opening 112. This permits access to the contents of the first chamber 122 of the cooler 116. In the first open position, the second chamber 124 remains disposed between the first side 108 and the second side 110 of the main body 102. Thus, the second chamber 124 remains sealed and the temperature of its contents is maintained while the cooler 116 is in the first open position.

In the second open position, shown in FIGS. 7-8, the cooler 116 is slid through the second opening 114 of the main body 102 so that the second chamber 124 is at least partly disposed at a location laterally outwardly from the second opening 114. This permits access to the contents of the second chamber 124 of the cooler 116. In the second open position, the first chamber 122 remains disposed between the first side 108 and the second side 110 of the main body 102. Thus, the first chamber 122 remains sealed and the temperature of its contents is maintained while the cooler 116 is in the second open position.

The tackle cool box 100 of the present disclosure may further have a lid 126. The lid 126 may be used to selectively seal a recess 128 formed in the top side 104 of the main body 102, for example. Advantageously, in embodiments where the main body 102 has a robust construction configured to support the weight of a fisherman, an outer surface of the lid 126 may be substantially free of protrusions. In this manner, one is also permitted to comfortably sit on the outer surface of the lid 126, and the tackle cool box 100 may be used as a bench or seat by the fisherman while fishing.

In a particular embodiment shown in FIGS. 5-8, the recess 128 also may contain a removable drawer 130. The removable drawer 130 can have a plurality of first compartments configured to store fishing tackle. The first compartments can be of the same size, or of different sizes in order to accommodate differently sized fishing tackle including lures, hooks, weights, and other fishing accessories.

As illustrated in FIGS. 1-8, the lid 126 may be hingedly attached to the main body 102 of the tackle cool box 100. The lid 126 is thereby rotatable between an open position and a closed position. In the closed position, shown in FIGS. 1-5, the recess 128 is sealed by the lid 126, for example, when the fishing tackle is not in use or is otherwise being stored. In the open position, shown in FIGS. 5-8, the recess 128 can be accessed, for example, to remove the fishing tackle stored therein.

In a further embodiment shown in FIGS. 5-8, the lid 126 may also have a plurality of second compartments. The second compartments may be formed in an inner surface of the lid 126, for example. Like the first compartments of the removable drawer 130, the second compartments can be of the same size, or of different sizes in order to accommodate differently sized fishing tackle including lures, hooks, weights, and other fishing accessories.

Where the lid 126 has the second compartments, the tackle cool box 100 may be further provided with a cover 132. The cover 132 is removably attached to the inner surface of the lid 126. For example, the cover 132 can be hingedly attached to the main body 102, and rotatable between an open position (shown in FIG. 6) and a closed position (shown in FIG. 8). The cover 132 may also securely but removably snap to the lid 126, for example, with a fastener providing a friction- or interference-fit with the lid 126, in order to selectively close or seal the second compartments. In one example, the cover 132 is transparent in order to allow one to view the contents of the second compartments without removing the cover 132. One of ordinary skill in the art may select other suitable means for removably attaching the cover 132 to the lid 126, for purposes of selectively closing the second compartments, as desired.

The tackle cool box 100 of the present disclosure may further have a handle 134. The handle 134 is rotatably connected to the first side 108 and the second side 110 of the main body 102. For example, the handle 134 has a first end 136 connected to the first side 108 of the main body 102, and a second end 138 connected to the second side 110 of the main body 102.

The means for connecting the handle 134 may include a first pin 140 and a second pin 142. The first pin 140 may be attached to one of the first end 136 of the handle 134 and the main body 102, and is rotatably seated in a corresponding hole formed in the other of the first end 136 of the handle 134 and the main body 102. The second pin 142 may be attached to one of the second end 138 of the handle 134 and the main body 102, and is rotatably seated in a corresponding hole formed in the other of the second end 138 of the handle 134 and the main body 102. It should be understood that other suitable means for rotatably connecting the handle 134 to the main body 102 may also be employed within the scope of the present disclosure.

The handle 134 is rotatable between a substantially upright position, for example, as shown in FIGS. 1-4, to a stored position, for example, as shown in FIGS. 5-8. In the substantially upright position, the handle 134 may be spaced apart from the top side 104 of the main body 102 and configured for one to lift and transport the tackle cool box 100 from one location to another location. In the stored position, the handle 134 may be rotated to either a front or a rear of the main body 102. For example, as shown in FIGS. 6 and 8, the handle 134 may be adjacent or abut the rear of the main body 102 where the handle 134 is rotated to the stored position.

Advantageously, a moving of the handle 134 to the stored position permits the lid 126 to be placed in the open position. In one embodiment, the first end 136 of the handle 134 has a first bottom side extension 144, and the second end 138 of the handle 134 has a second bottom side extension 146. The first bottom side extension 144 may extend away from the first pin 140 and corresponding hole, and the second bottom side extension 146 may extend away from the second pin 142 and corresponding hole. Where the handle 134 is rotated to the substantially upright position, the first bottom side extension 144 and the second bottom side extension 146 militate a lateral movement of the cooler 116 from the closed position. Where the handle 134 is rotated to the stored position, the first bottom side extension 144 and the second bottom side extension 146 are rotated to a position above the cooler 116 to allow the lateral movement of the cooler 116 from the closed position.

The handle 134 of the present disclosure may also be substantially arcuate in shape. The substantially arcuate shape of the handle 134 causes the ends 136, 138 of the handle 134 to flex inwardly and engage the cooler 116 with the first bottom side extension 144 and the second bottom side extension 146 when the tackle cool box 100 is lifted by the handle 134. This spring force is believed to further secure the cooler 116 within the main body 102 of the tackle cool box 100 when transported, for example, when the tackle cool box 100 is being moved to a fishing boat, dock, or shore for use in fishing.

The main body 102 of tackle cool box 100 may further have a plurality of legs 148. The legs 148 are configured to support the main body 102 on a surface. In certain embodiments, the legs 148 may be integrally formed with the main body 102, for example, by the injection molding process. In other embodiments, the legs 148 may be separately formed and subsequently affixed to the main body 102 with fasteners such as screws, bolts, rivets, or chemical adhesives, as nonlimiting examples.

The legs 148 may be formed from a material and have a construction sufficient to support the weight of an adult fisherman, in order to permit the tackle cool box 100 to also function as a bench or seat. One skilled in the art may select suitable materials and constructions for the legs 148 of the main body 102, as desired.

As illustrated in FIGS. 1-2, 5, and 7, at least one of the legs 148 has a beverage receptacle 150. The beverage receptacle 150 may be formed in the leg 148, or separated formed and attached to the leg 148 with a fastener, as desired. The beverage receptacle 150 is configured to receive one of a can, a bottle, and a cup.

In a particular embodiment, a hole 152 is also formed in a base of the beverage receptacle 150. The hole 152 is configured to receive a handle of a fishing rod 150. In an exemplary embodiment, the hole 152 may also have an elongate or substantially oval shape in order to permit the fishing rod 150 to be oriented at an acute angle relative to the surface on which the tackle cool box 100 is sitting. A skilled artisan may select suitable shapes and sizes for the beverage receptacle 150 and the rod-holding hole 152, as desired.

Advantageously, the tackle cool box 100 of the present disclosure may be used as a combined tackle box 102 and cooler 116 for separately storing both bait and beverages or food. The tackle cool box 100 may further be used as a chair, seat, or bench, and has a combination can and rod holder 150, 152 that is accessible while one is seated. This smartly integrated package has a sturdy construction with four legs 148 for seating, integral tackle compartments inside the lid 126, removable tackle compartment in the main body 102 of the tackle box, and two chambers 122, 124 in the cooler 116. The cooler 116 is also removable for cleaning and accessible while seated for bait and/or food and beverages. The tackle cool box 100 also advantageously has the locking handle 134 to keep the cooler 116 from sliding out during transport. Moreover, the lid 126 has a substantially fluid- or water-tight seal with the main body 102 when in the closed position, which is particularly useful for wet weather fishing.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tackle cool box, comprising:
a main body having a top side, a bottom side, a first side with a first opening, and a second side with a second opening, wherein the main body has a recess formed in the top side of the main body;
a cooler slidably attached to the bottom side of the main body, the cooler having a first chamber and a second chamber, the cooler slidable to each of a closed position, a first open position, and a second open position, the first chamber and the second chamber of the cooler both disposed between the first side and the second side of the main body in the closed position, the first chamber at least partly disposed at a location laterally outwardly from the first opening of the main body and the second chamber disposed between the first side and the second side of the main body in the first open position, and the second chamber at least partly disposed at a location laterally outwardly from the second opening of the main body and the first chamber disposed between the first side and the second side of the main body in the second open position;
a lid hingedly attached to the main body and rotatable between an open position to permit access to the recess formed in the top side of the main body and a closed position to seal the recess formed in the top side of the main body; and
a handle rotatably connected to the first side and the second side of the main body, the handle rotatable between a substantially upright position spaced apart from the top side of the main body and a stored position adjacent a rear of the main body, wherein the handle has a first end and a second end, the first end connected to the first side of the main body with a first pin attached to one of the handle and the main body, and the second end connected to the second side of the main body with a second pin attached to one of the handle and the main body, and wherein the first end of the handle has a first bottom side extension extending away from the first pin and the second end of the handle has a second bottom side extension extending away from the second pin, the first bottom side extension and the second bottom side extension together militating against a movement of the cooler from the closed position where the handle is in a substantially upright position, and wherein the handle is substantially arcuate in shape, and the ends of the handle are configured to flex inwardly to engage the cooler with the first bottom side extension and the second bottom side extension when the tackle cool box is lifted by the handle.

2. The tackle cool box of claim 1, further comprising a drawer with a plurality of first compartments, the drawer removably disposed in the recess.

3. The tackle cool box of claim 1, wherein an outer surface of the lid is free of protrusions and permits one to comfortably sit on the outer surface of the lid.

4. The tackle cool box of claim 1, wherein the lid has a plurality of second compartments, the second compartments formed in an inner surface of the lid.

5. The tackle cool box of claim 4, further comprising a cover removably attached to the inner surface of the lid and configured to selectively close the second compartments.

6. The tackle cool box of claim 1, wherein the cooler has lips disposed on opposing sides of the cooler that are received by channels disposed on the bottom side of the main body.

7. The tackle cool box of claim 6, wherein the channels extend between the first side and the second side of the main body.

8. The tackle cool box of claim 1, wherein the cooler in the closed position forms a substantially fluid-tight seal with the main body.

9. The tackle cool box of claim 1, wherein the handle in the stored position permits the lid to be disposed in the open position.

10. The tackle cool box of claim 1, wherein the main body has a plurality of legs for supporting the main body on a surface.

11. The tackle cool box of claim 10, wherein at least one of the legs has a beverage receptacle configured to receive one of a can, a bottle, and a cup.

12. The tackle cool box of claim 11, wherein a hole is formed in a base of the beverage receptacle, the hole configured to receive a handle of a fishing rod.

* * * * *